United States Patent [19]

Fields et al.

[11] Patent Number: 4,839,916
[45] Date of Patent: Jun. 13, 1989

[54] TELEPHONE TOLL INTEGRITY CHECKING SYSTEM

[75] Inventors: Gary C. Fields; Mark E. Stamos, both of Oakland, Calif.

[73] Assignee: Conway Engineering, Inc., Oakland, Calif.

[21] Appl. No.: 101,062

[22] Filed: Sep. 25, 1987

[51] Int. Cl.$^4$ ............................................. H04M 3/26
[52] U.S. Cl. ........................................ 379/13; 379/139
[58] Field of Search ....................... 379/5, 6, 9, 10, 13, 379/134, 139

[56] References Cited

U.S. PATENT DOCUMENTS 4,311,882 1/1982 Johner et al. .......................... 379/10

Primary Examiner—Stafford D. Schreyer
Attorney, Agent, or Firm—David B. Harrison

[57] ABSTRACT

Apparatus for automatically obtaining data useful to determine accuracy of telephone toll message accounting equipment and procedures is disclosed. The apparatus is connected to plural telephone network lines of the telephone system at a central office location and simultaneously dials a plurality of predetermined long distance telephone numbers, each of which returns detectable information when successfully dialed up. The presence of the detectable information, such as test tone, is noted and the time is logged. This information is then automatically compared by a central control computer with the billing information collected by the billing computer to ascertain operational accuracy of the latter. The apparatus is automatically remotely operated by the central control computer under a predetermined protocol.

14 Claims, 15 Drawing Sheets

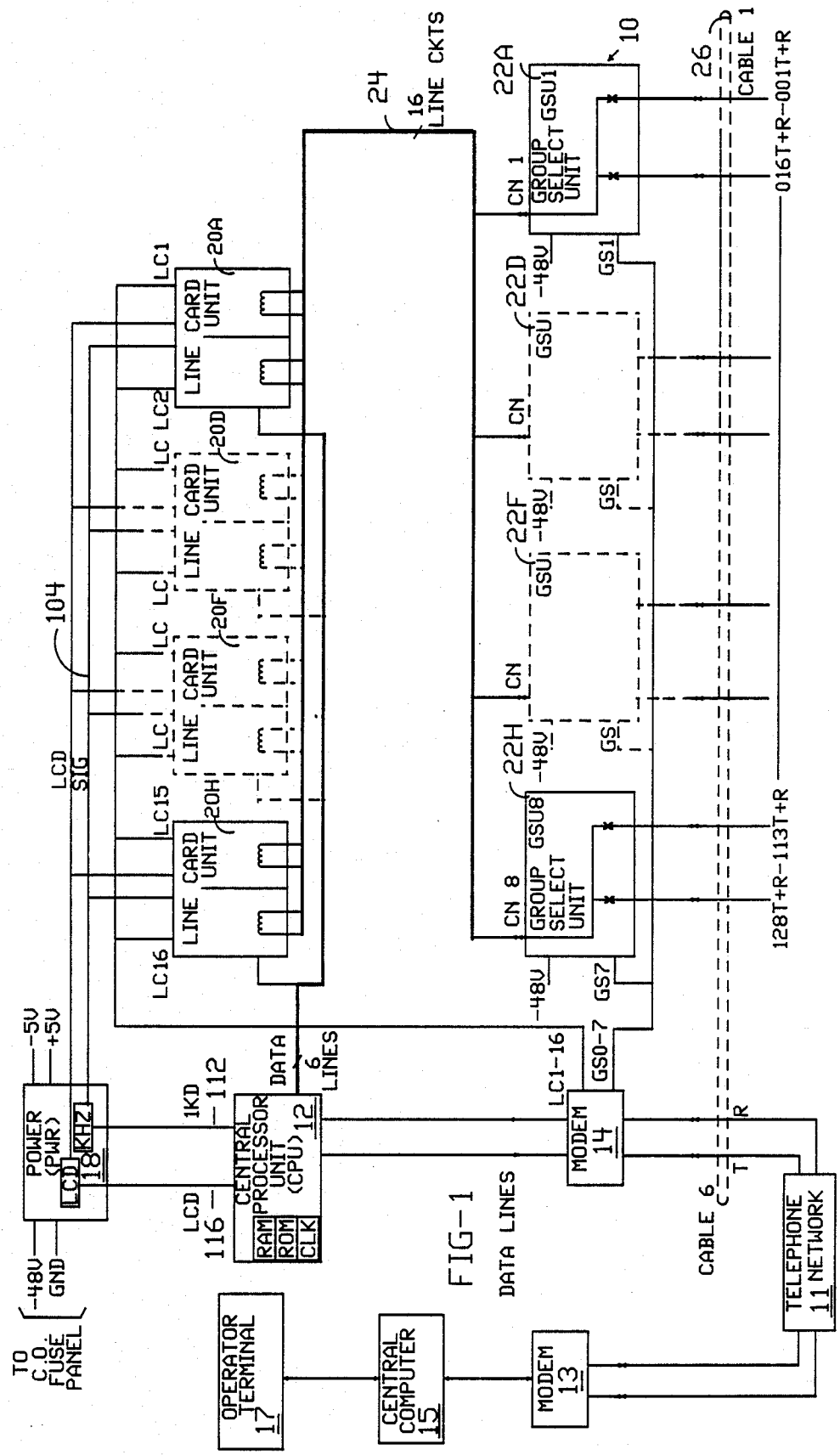

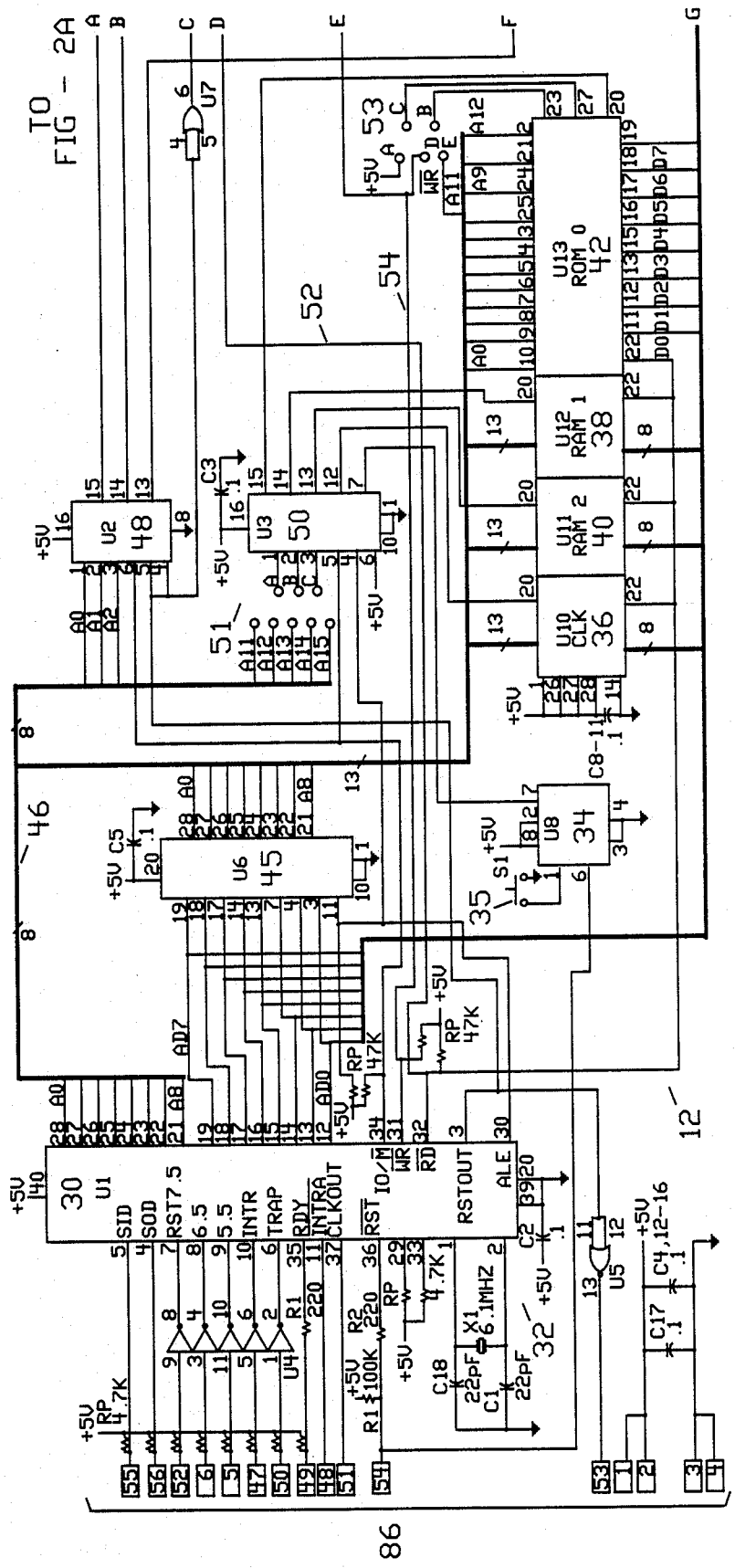

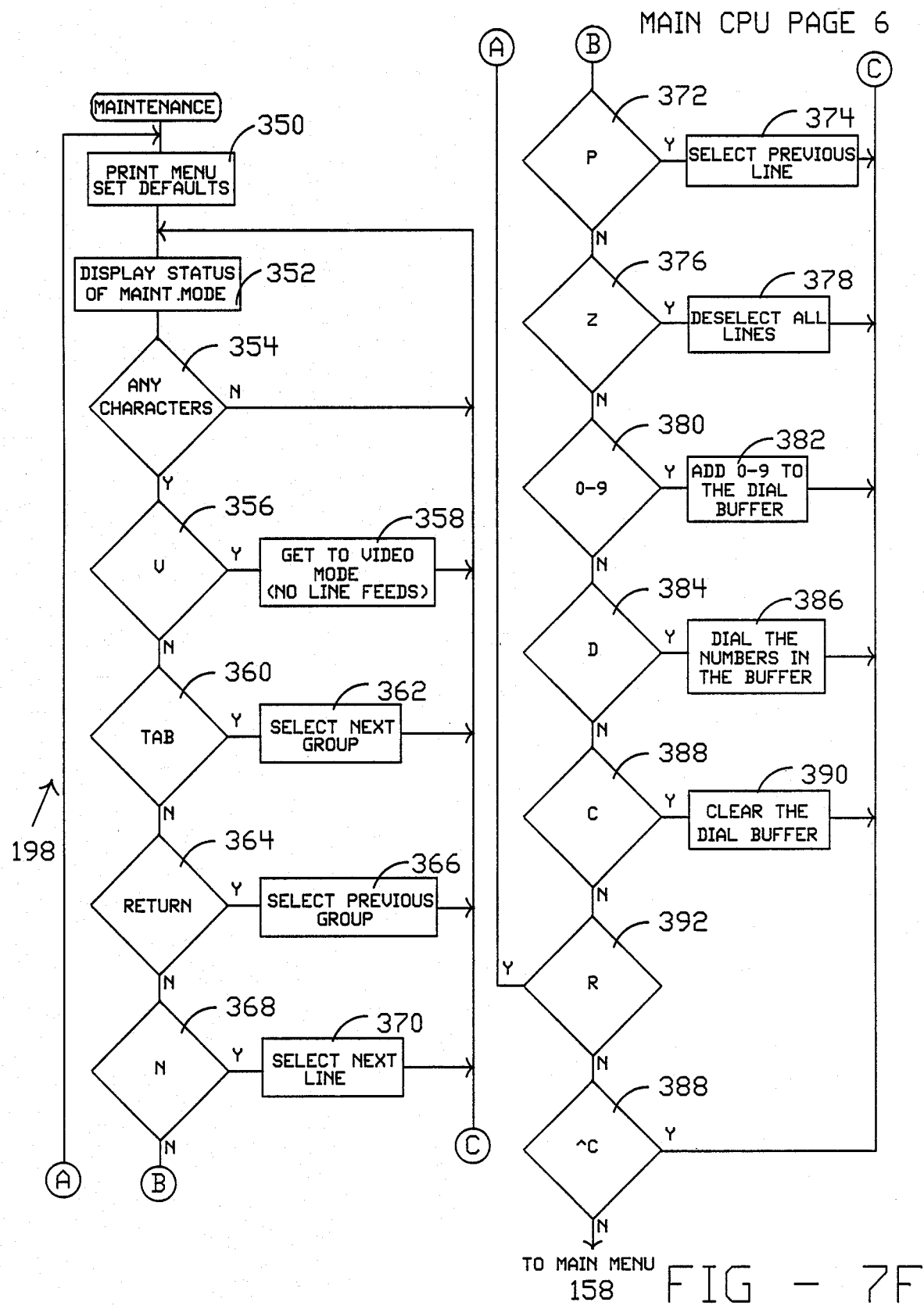

TELEPHONE TOLL INTEGRITY CHECKING SYSTEM

FIELD OF THE INVENTION

The present invention relates to telephone system test equipment. More particularly, the present invention relates to telephone system test equipment for automatically testing the accuracy of automatic message accounting data accumulated at a central office relating to long distance tolls.

BACKGROUND OF THE INVENTION

Since the deregulation of the long distance telephone network, and the emergence of a number of long distance carriers vying for equal access to and from regulated operating company central office facilities, a need has arisen to confirm the accuracy of automatic message accounting ("AMA") data collected at each central office facility. This data forms the basis for charging for long distance toll calls, irrespective of the long distance carrier or class of service. Its accuracy must be verified in order to protect not only the telephone subscriber population base, but also the regulated operating companies and the competing long distance carriers.

Of course, one problem is to verify that long distance toll charges are accurately calculated and accurately posted to the appropriate subscriber's account. While gross inaccuracies will be detected by alert subscribers who audit their telephone service bills, slight inaccuracies may likely go undetected. Another significant problem with AMA data is that some long distance calls slip through the accounting system without ever being logged for billing purposes, thereby depriving the long distance carrier whose path was used of duly earned revenue.

Automatic dialing routiners are known in the prior art. Such equipment typically has the capability for dialing a one or more telephone numbers in a prearranged sequence automatically. Typically, such routiners may be used to deliver advertising messages to, or conduct surveys of, telephone subscribers on a preselected or random selection basis. They may also be used to make test telephone calls on a call by call basis.

Each central office facility within the domestic telephone network typically provides one or more special numbers for testing purposes. Typically, these special telephone numbers return a test signal or condition when dialed up. One commonly found test condition is a low level audio tone, typically at 1000 Hertz. These special telephone numbers are known within the telephone network to those who have a requirement for their use.

A hitherto unsolved need has arisen for telephone system test equipment for automatically testing the accuracy of automatic message accounting data accumulated at a central office relating to long distance tolls by placing multiple simultaneous toll calls to preknown test numbers of distant central offices, detecting successful completion of such toll calls and recording the time thereof for comparison with parallel AMA data accumulated at the call origination central office facility.

SUMMARY OF THE INVENTION WITH OBJECTS

A general object of the present invention is to provide an automatic telephone toll integrity checking system which overcomes the limitations and drawbacks of the prior art.

A more specific object of the present invention is to provide a remotely programmed and controlled telephone toll integrity checking system located at a central office which makes multiple simultaneous telephone toll calls to preknown test numbers of distant exchanges, detects successful completion of such calls and records calling activity for later correlation with AMA data collected at the same central office facility.

A further object of the present invention is to collect and provide objective data confirming the accuracy or detecting the inaccuracy of automatic message accounting processes in place in a telephone operating company so as to satisfy legitimate interests of service subscribers, long distance carriers and regulatory authorities with regard to the integrity of the automatic message accounting processes upon which service charging and long distance toll revenues are based.

One more object of the present invention is the provision of an array of programmable digitally controlled line cards, each capable of accomodating a pair of central office dial lines, the line cards operating under the automatic supervision of a digital controller.

Apparatus for implementing the present invention automatically obtains data useful to determine accuracy of telephone toll message accounting equipment and procedures. In order to collect this data the apparatus is connected to plural telephone network lines of the telephone system at a predetermined location, such as a central office facility. The apparatus is programmable for simultaneously dialing a plurality of predetermined long distance telephone test numbers. Each test number typically returns a predetermined test signal when successfully dialed up, and the apparatus automatically detects the presence of the test signal of each test number dialed and thereupon logs the time of each such call.

The apparatus includes plural programmable line connection and calling circuits, each one thereof being capable of accessing a telephone line and placing a telephone call to a test telephone number, group switching units connected to the plural line calling circuits and to multiple telephone lines for selectively connecting the telephone network lines with the line calling circuits, call connection detection circuits for detecting the presence of the test signal when a test number is successfully dialed up, and a system controller connected to the plural line connection and calling circuits and the group switching units for controlling selective connections of the telephone network lines with the line calling circuits, for controlling dial up operation of each line calling circuit and for recording in memory a time of a call resulting in detection of the test signal.

The apparatus may further include a modem connected to the controller and connectable via a telephone network line to remote control apparatus for receiving commands from the remote control apparatus and for returning data to the remote control apparatus, via the line.

The apparatus may further be configured so that the plural line connection and calling circuitry is capable of dialing up to sixteen telephone numbers as a single batch process, each number being separately prespecified to the plural line connection and calling circuitry specified via the controller.

The apparatus may also be configured for installation at a telephone central office location and may further include a power supply for converting voltage levels obtained directly from a central office battery supply into operating voltages for operating the apparatus.

The method of the present invention provides for automatically collecting information useful to ascertain accuracy of long distance toll call accounting procedures of a local central office switching center of the telephone system. These procedures include recording called party number, date/time and duration of each long distance toll call. Also, central offices of the telephone system distant from the local central office switching center provide predetermined telephone test numbers which when dialed return a predetermined test signal. The method of this invention includes the steps of:

providing a series of the predetermined telephone test numbers to programmable automatic dial up apparatus capable of simultaneously placing calls via lines of the local central office to the test numbers;

operating the dial up apparatus to place simultaneous calls to said telephone test numbers of the series irrespective of actual communications path or long distance carrier, monitoring with monitoring apparatus the lines of the local central office to detect presence of the predetermined test signal thereon, recording with recording apparatus the time at which the predetermined test signal is detected on the line on which the predetermined telephone test numbers was dialed, disconnecting from the line following successful detection of the predetermined test signal, disconnecting from the line after a predetermined time period and no detection of the predetermined test signal, accumulating in data collection apparatus each record as a data base for subsequent correlation with data collected by the long distance toll call accounting procedures of the local central office to ascertain the accuracy thereof.

Preferably the operations of the dial up apparatus, the monitoring apparatus, the recording apparatus and the data collection apparatus are controlled with a programmed digital microprocessor.

These and other objects, advantages, features and aspects of the present invention will be more fully understood and appreciated upon consideration of the following detailed description of a preferred embodiment, presented in conjunction with the accompanying drawing.

BRIEF DESCRIPTION OF THE DRAWINGS

FIG. 1 is a block diagram of a telephone toll integrity checking system in accordance with the principles of the present invention.

FIGS. 2A and 2B together comprise a single circuit diagram of a controller unit of the FIG. 1 system, with the FIG. 2A sheet arranged horizontally and to the left, and with the FIG. 2B sheet arranged vertically and to the right.

FIGS. 7A, 7B, 7C, 7D, 7E, and 7F comprise a flow diagram of a main control program for controlling operation of the FIG. 2 controller unit.

DETAILED DESCRIPTION OF A PREFERRED EMBODIMENT

Overview of System 10

Figure 2A:
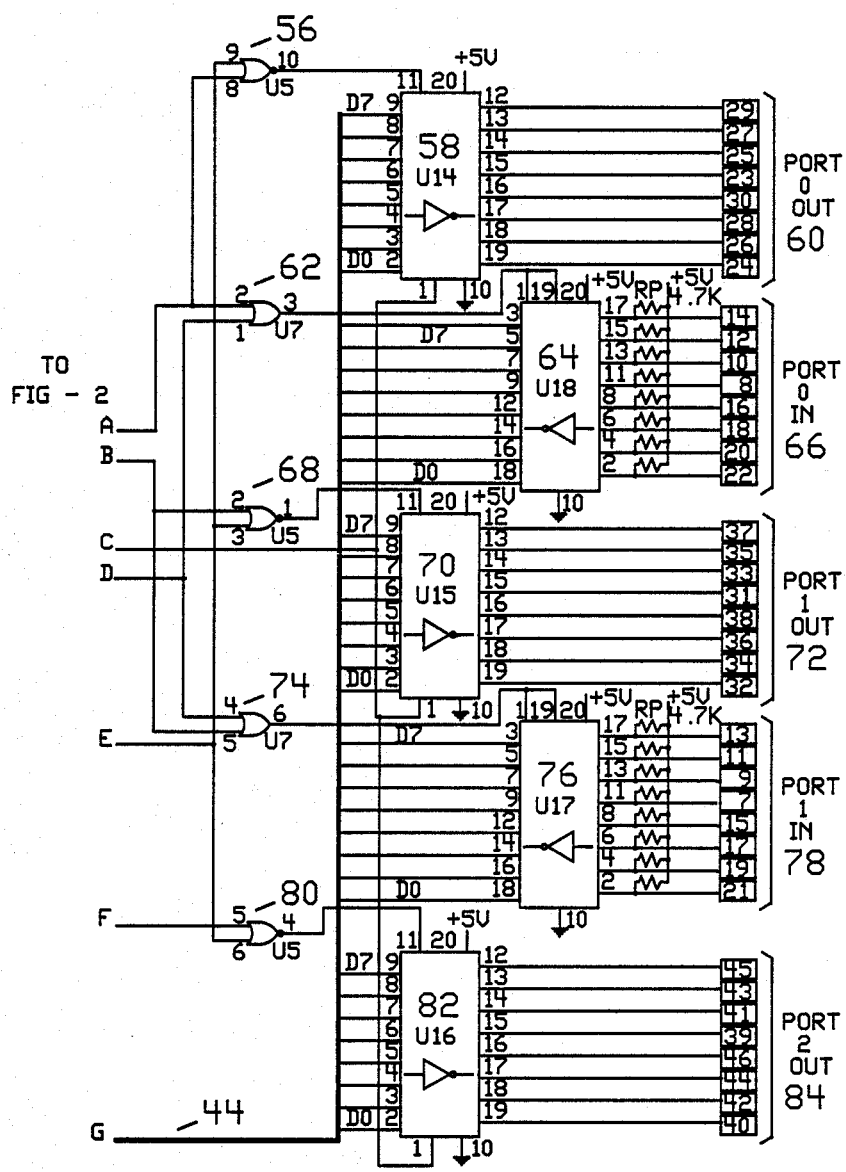

A telephone toll integrity checking system 10, constructed in accordance with the principles of the present invention, is shown in overview in FIG. 1. Therein, the system 10 includes a central processor unit 12; a modem unit 14 connected to a dedicated telephone line 16 within e.g. a central office environment; a power supply and test signal detector unit 18; a series of dual-line line conection and calling units 20, such as eight units 20A, 20B, 20C, 20D, 20E, 20F, 20G, and 20H; and a series of group select units 22, such as eight units 22A, 22B, 22C, 22D, 22E, 22F, 22G and 22H. Sixteen tip and ring wire line circuits extend from the group select units 22A-H to the dual-line line connection units 20A-H via an internal trunk 24.

All of the units 12, 14, 18, 20 and 22 are preferably formed on plug in cards which are contained and connected within a single rack-mounted housing within a local central office facility. A backplane plug array within the housing enables each of the cards to be connected to the others and to the telephone lines. 48 volt battery from the central office supply is conveniently available to power the circuits within the system 10. And, 129 lines from the central office distribution rack are preferably connected to the system via a suitable cable 26. The cable 26 is composed of six groups of 25 tip and ring wire pairs, for example. The data line 16 is one of the tip and ring wire pairs contained within the cable 26.

The system 10 is connected via the data line 16 through the telephone system 11 to a modem 13 of a central computer 15 which also typically includes at least one operator terminal 17. In this manner, the central computer 15 may directly address and control the system 10 in accordance with a format or protocol discussed hereinafter in conjunction with the system control program depicted in FIGS. 7A through 7F.

Central Controller Card 12

The central processing unit controller card 12 includes a low power monolithic microprocessor 30 operating as a "main CPU", such as an Intel type 80C85, or equivalent. Timing of microprocessor clocking cycles is established by a crystal frequency reference circuit 32. A watchdog timer circuit 34 provides a reset signal for the microprocessor 30 from three separate sources. First, an internal pulse shaping circuit enables a manual push switch 35 to be used to generate a reset signal. Second, an internal power monitor causes a reset any time that the voltage level put out of the power supply falls below ten percent of the nominal 5 volt supply value. Third, the absence of a software generated pulse at regular intervals (not to exceed 500 milliseconds, for example) also causes a reset pulse to be generated to reset the microprocessor 30.

A real time clock chip 36, such as type 2DS1216, made by Dallas Semiconductor, provides a real time clock for the system 10. Two random access memories 38 and 40, such as type 2016C, provide volatile storage for values generated during program execution and for accumulation of a data base for checking integrity of the central office automatic message accounting function in accordance with the intended purpose of the present invention. A read only memory 42, such as a type 2764 EPROM, contains up to eight kilobytes of program routines for controlling operations of the microprocessor 30. These control routines for the microprocessor controller 30 are described hereinafter in conjunction with FIGS. 7A-F.

An eight bit digital data bus 44 extends from the microprocessor 30 to the other digital circuit elements as depicted in FIG. 2. The data bus also is used to provide the lower eight bits of sixteen bit address words from the microprocessor. These bits are latched into an address latch 45 during each address cycle of the microprocessor 30. The latch 45 is enabled by the address latch enable (ALE) signal put out by the microprocessor 30. The higher eight bits of the sixteen bit address words are put out from a separate port of the microprocessor 30 on a bus 46. The address bus 46 extends to two decoders 48 and 50. The decoder 48 controls enablement of three data ports, and the decoder 50 controls enablement of the clock 36, random access memories 38 and 40, and read only memory 42. Jumpers 51 and 53 enable hardware patching of addresses for enabling the clock 36, and the memories 38, 40 and 42 to accomodate different size EPROM memories to be used for storage of the program routines.

An AND gate 56, enabled by the decoder 48 and the write line (BAR WR), selects a tri-state driver chip 58 to provide a first data output port 60. An AND gate 62, enabled by the decoder 48 and the read line (BAR RD), selects a tri state driver 64 to provide a first data input port 66. An AND gate 68, enabled by the decoder 48 and the write line, enables a tri-state driver chip 70 to provide a second data output port 72. An AND gate 74, enabled by the decoder 48 and the read line, selects a tri-state driver 76 to provide a second data input port 78. Finally, an AND gate 80, enabled by the decoder 48 and the write line, selects a tri-state driver 82 to provide a third data output port 84.

Control signals are carried on a control bus 86 which extends to other cards of the system 10 via the interconnection backplane as do the three data output buses 60, 72 and 84, and the three data input buses 66 and 78.

Modem Card 14

Figure 3:
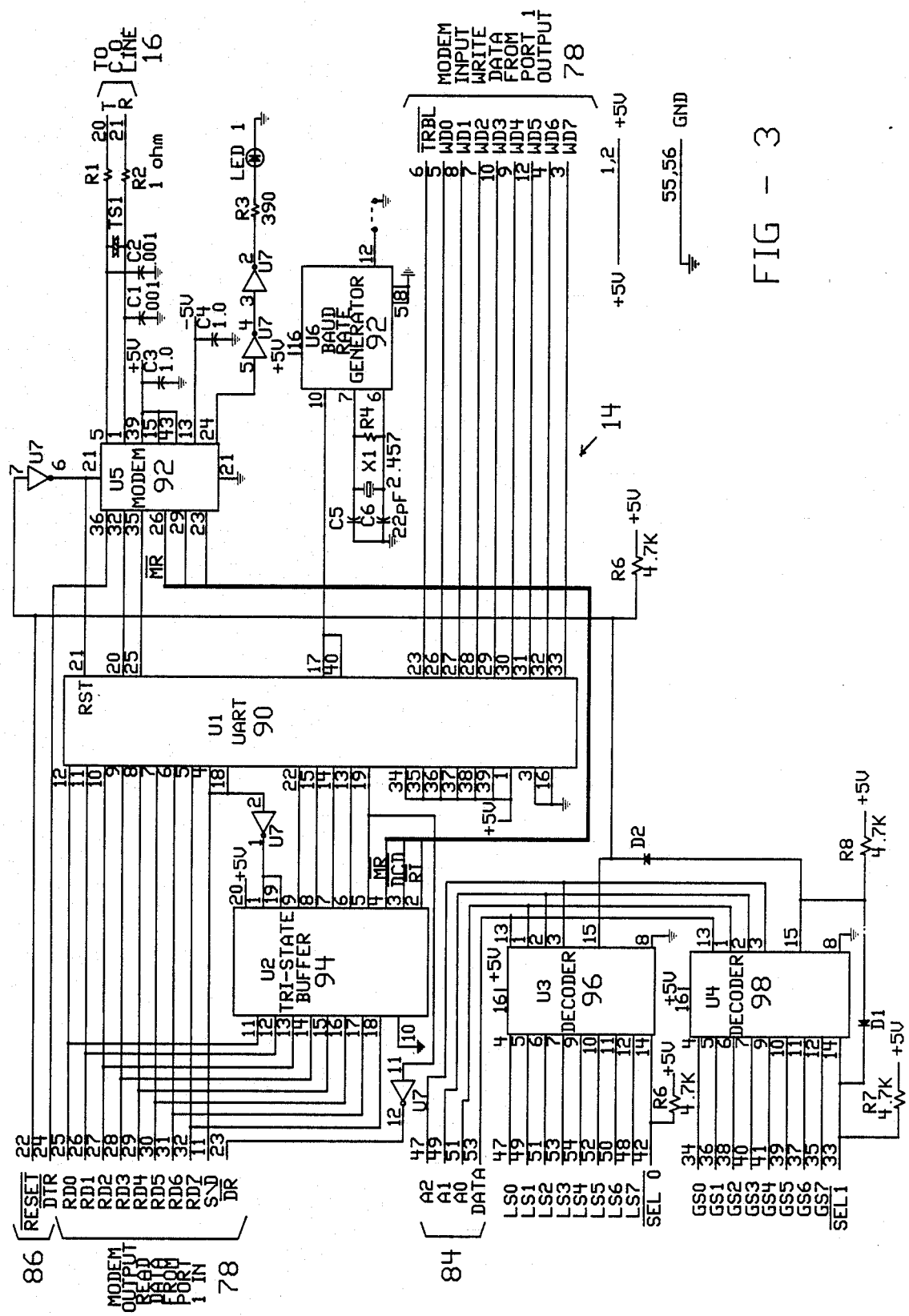
FIG. 3 is a circuit diagram of a modem unit of the FIG. 1 system.

The modem unit 14 is shown in FIG. 3. Therein, a UART chip 90, such as Intersil type 1M6402, converts parallel word digital data to and from serial bit data streams. Serial data is passed to a modem chip 92, such as Cermetex type CH17L70. The modem circuit 92 is adapted for direct connection to the central office data line 16. Incoming serial bit sequences from the central control computer 15 are received by the modem circuit 92, and outgoing data base information is sent via the modem circuit 92 and line 1b to the central computer 15 at e.g. a remotely located central data processing facility. Baud rate of the serial data stream generated by the UART chip 90 is established precisely by a baud rate generator chip 93, such as Intersil type 1M4702JE, which is connected to provide e.g. a 1200 baud rate to the UART 90. A tri-state buffer 94 enables certain status bytes from the UART 90 to be formed and placed onto the controller unit second input port 78.

Figure 5:
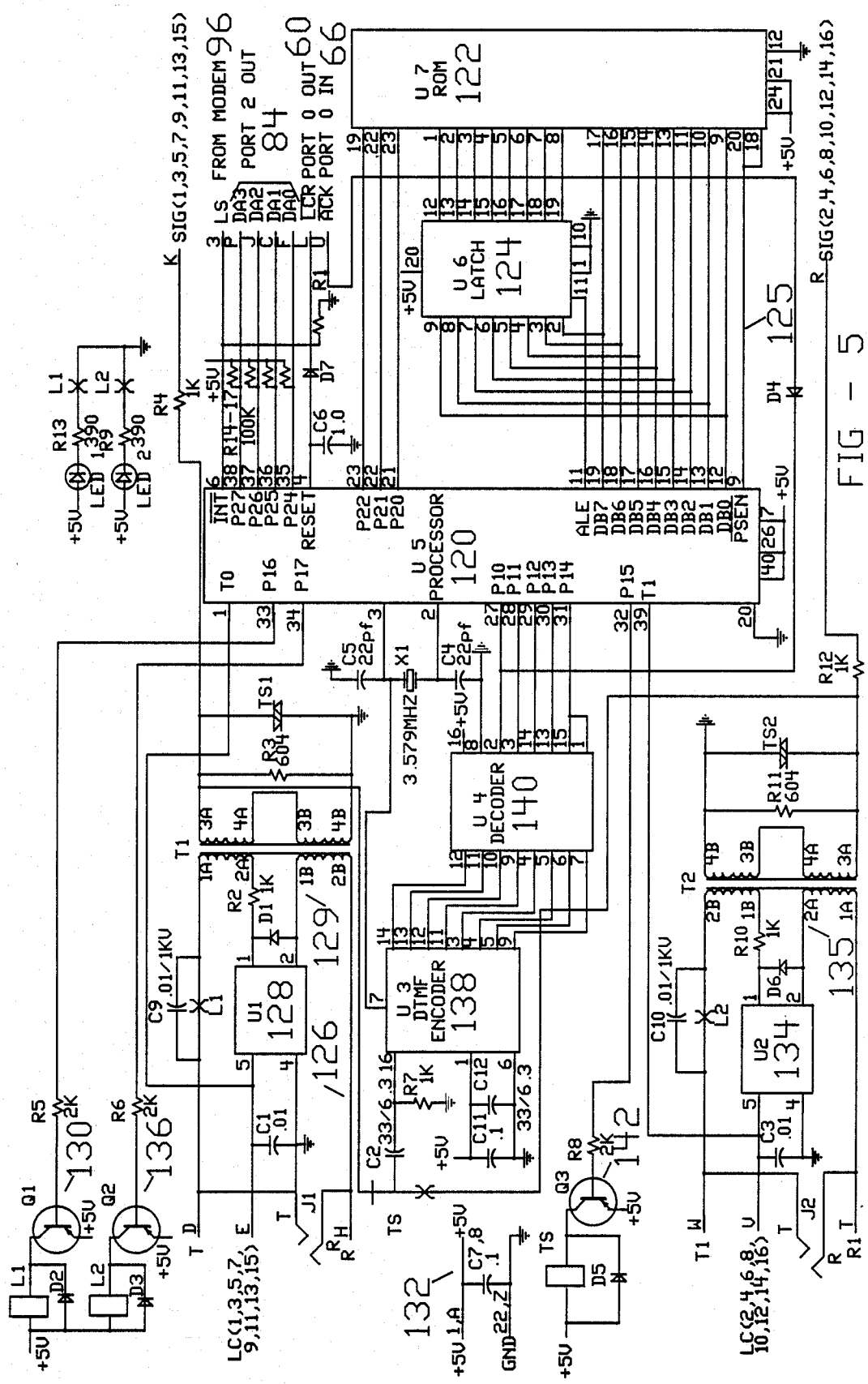
FIG. 5 is a circuit diagram of a line connection and calling unit of the FIG. 1 system.
Figure 6:
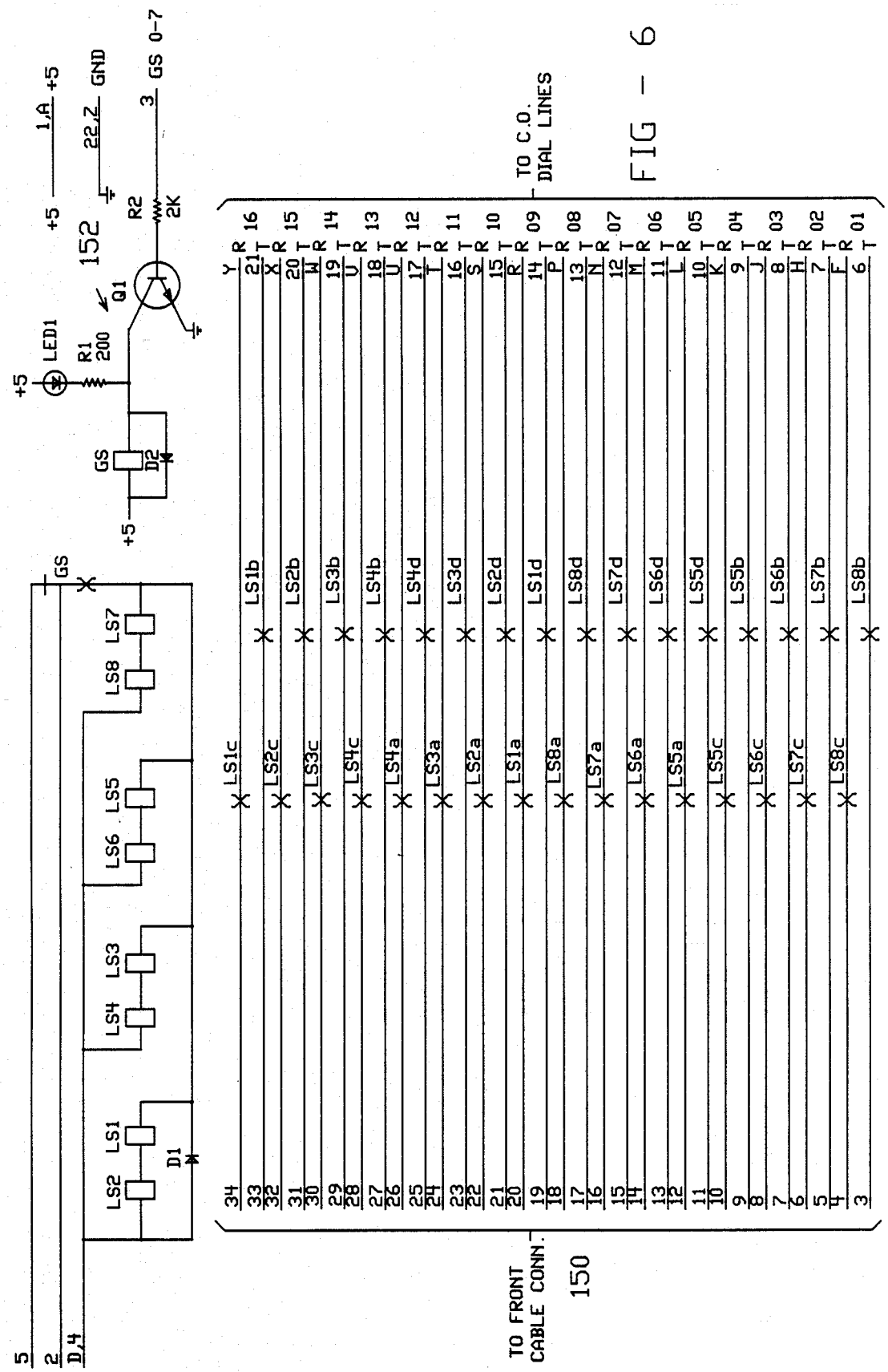
FIG. 6 is a circuit diagram of one of a plurality of group select units of the FIG. 1 system.
Figure 7A:
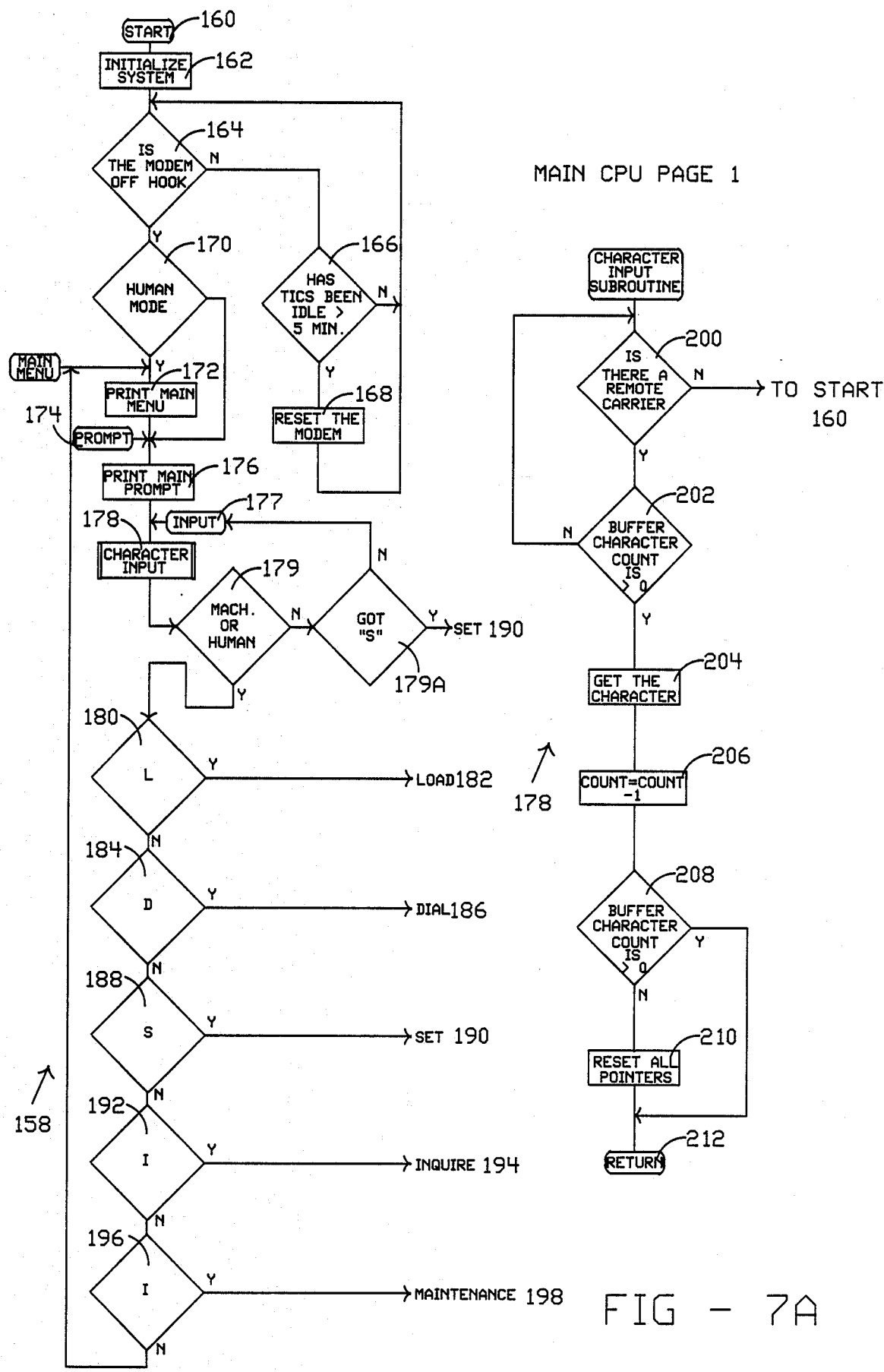
Figure 7B:
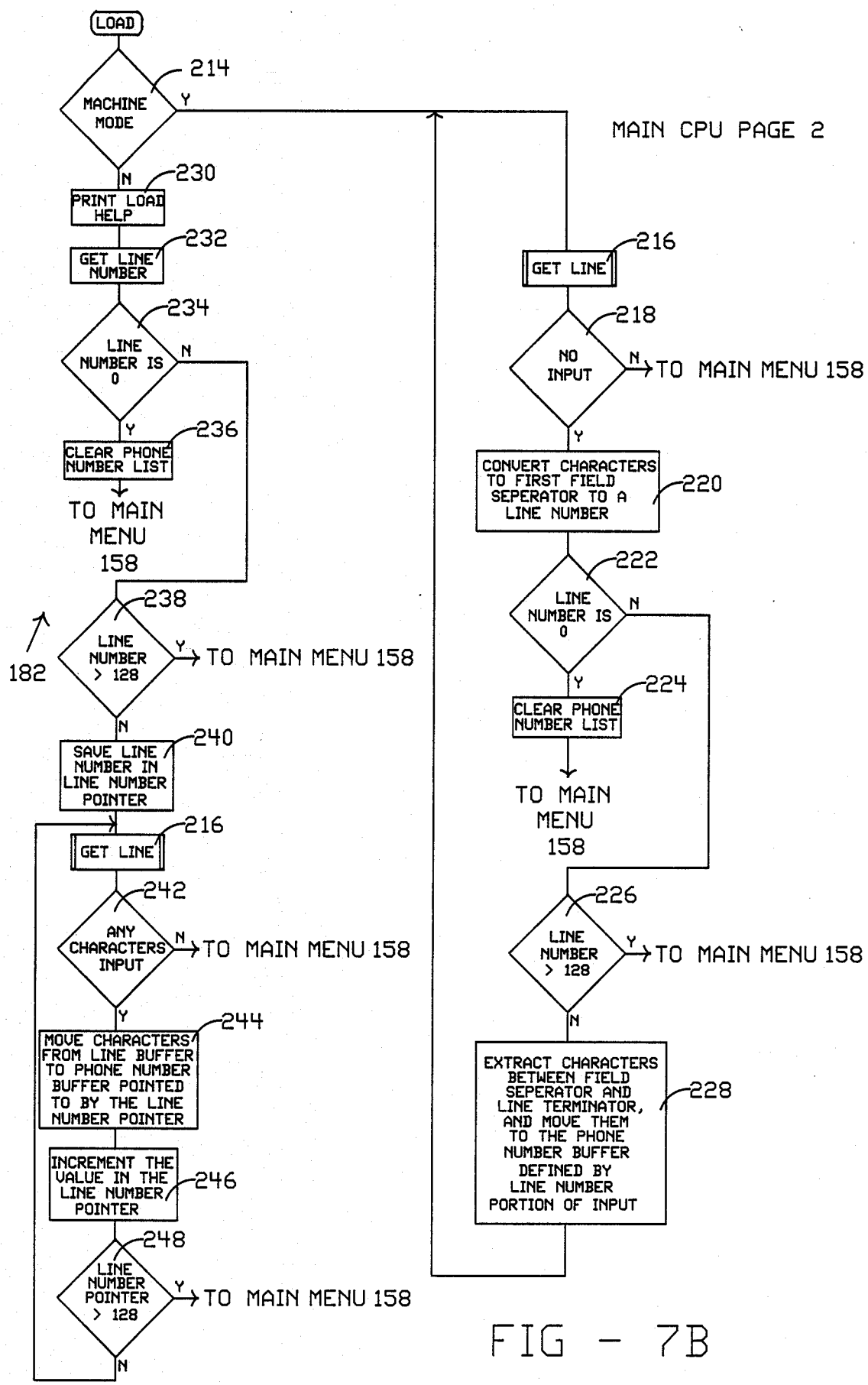
Figure 7C:
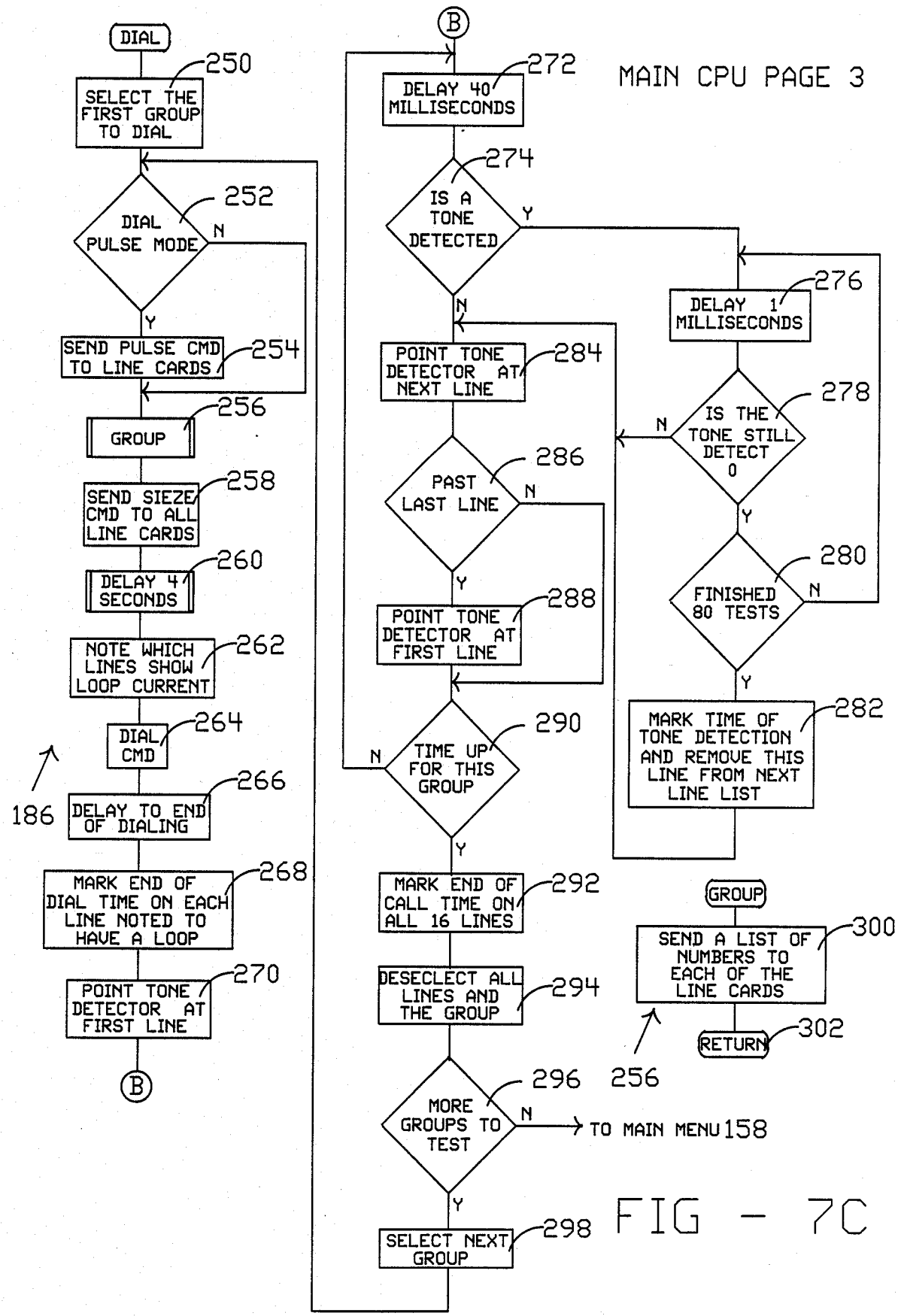
Figure 7D:
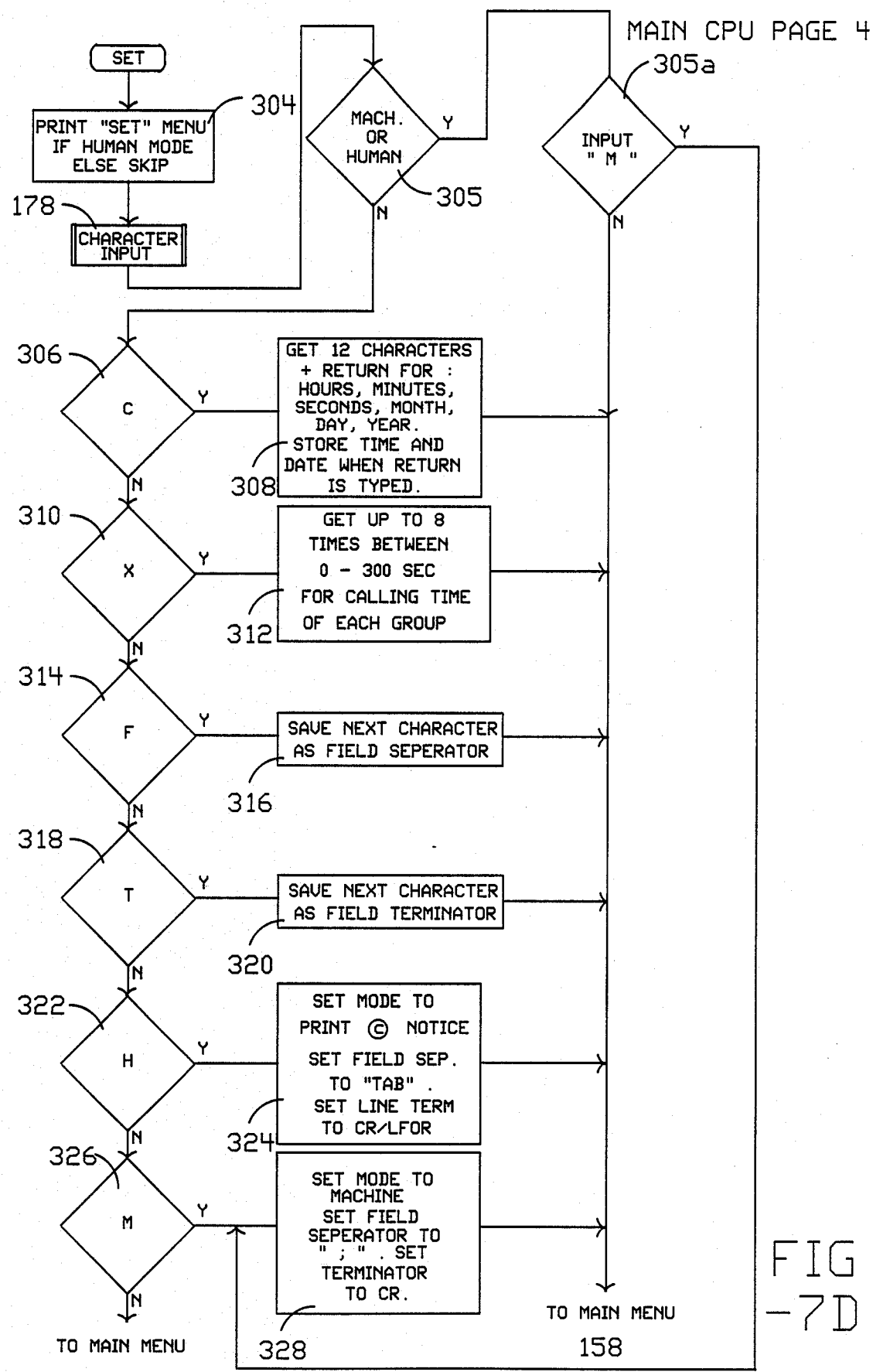
Figure 7E:
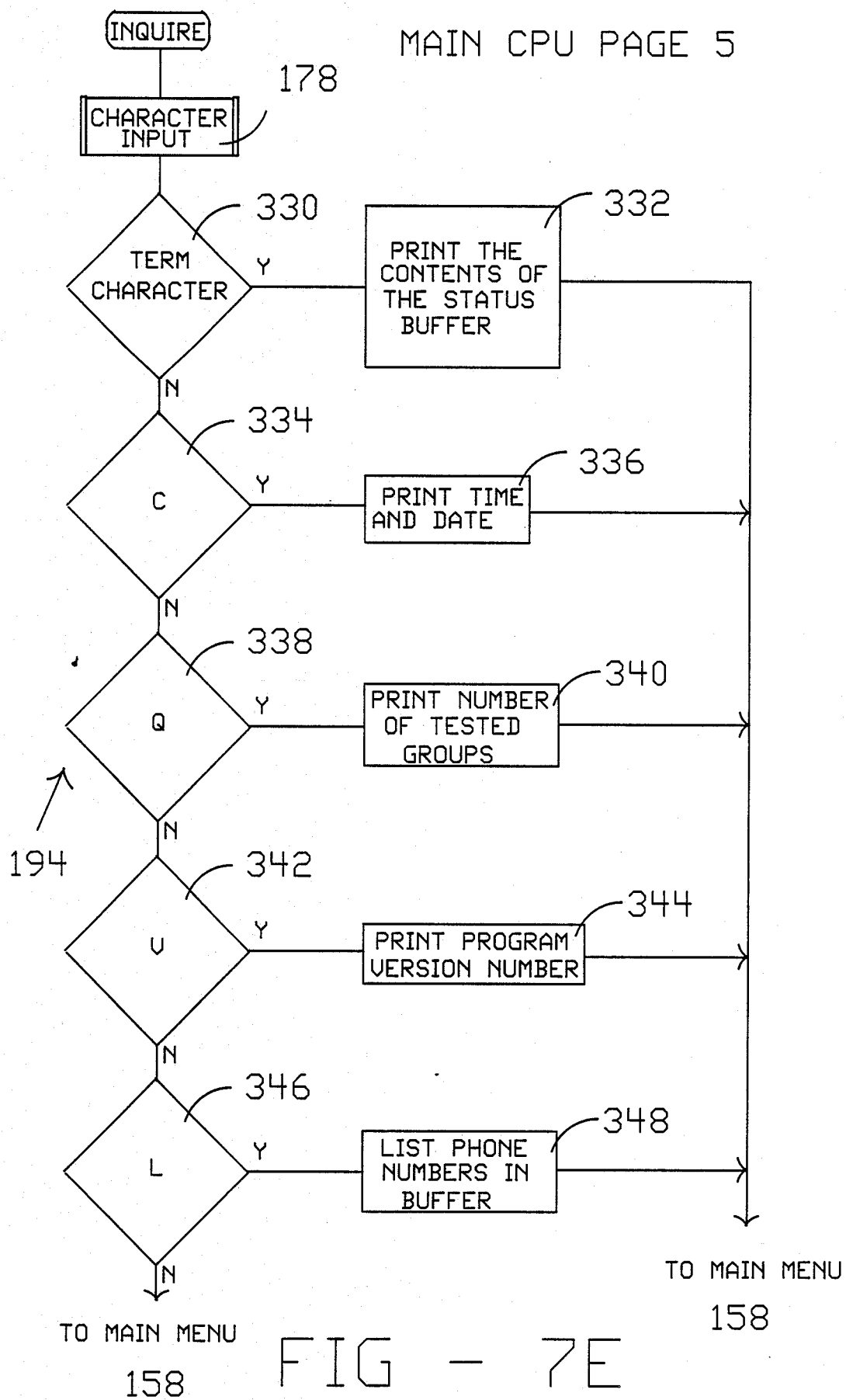

There are two decoder circuits 96 and 98 present on the modem card 14. These circuits are related to, and will be discussed in connection with, the line select cards 20 discussed subsequently in connection with FIG. 5 and the group select cards 22 which is discussed subsequently in connection with FIG. 6.

Power Supply/Tone Detect Card 18

Figure 4:
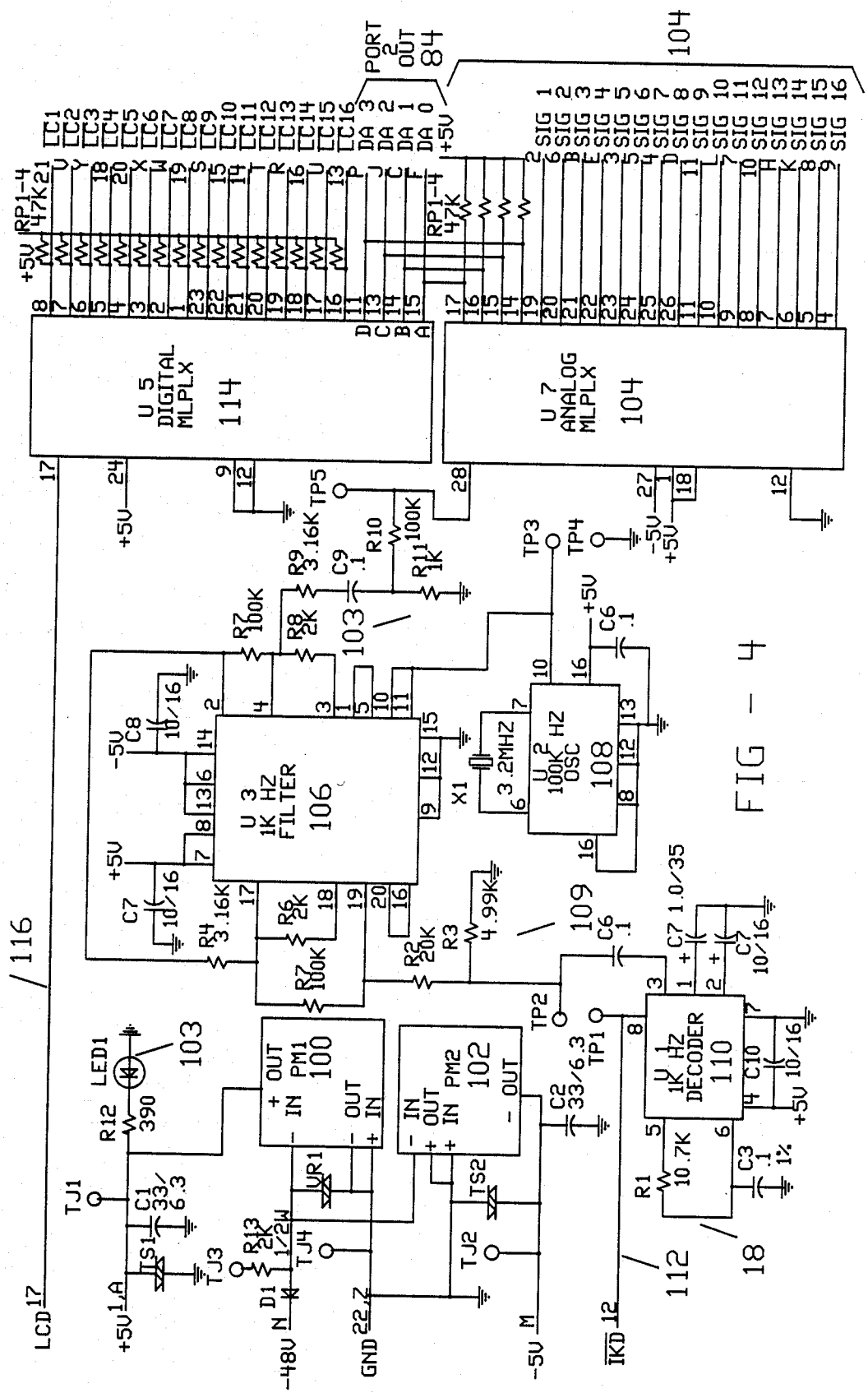
FIG. 4 is a circuit diagram of a power supply and tone detector unit of the FIG. 1 system.

The power supply and tone detect unit 18 is depicted in FIG. 4. Therein, two switching regulator power module circuits 100 and 102 respectively generate plus 5 V DC and minus 5 V DC from the central office −48 volt system battery. The miniature power modules are preferably Packaged Power type PM941 modules. A light emitting diode 103 provides a visual indication that the power modules are operating and are converting the central office battery voltage to lower operating voltages for use within the system 10.

The tone detect circuitry of the unit 18 includes an analog multiplex circuit 104, such as Harris type HI-506A, which has 16 analog inputs SIG 1 through SIG 16 inclusive; each one being connected to a particular line connection circuit of the line connection units 20. The particular input is determined by a four bit word received from the microprocessor controller 12 via the third output port 84. The signal present on the selected analog signal line is passed through a first attenuation network 103 to a one kilohertz digital notch filter 106, implemented with a monolithic chip, e.g. Linear Technology type LTC1060CN, with a center frequency of 1000 Hz±20 Hz. The center frequency is set by an external, crystal controlled clock oscillator 108, e.g. Intersil type IM4712IJE, operating at e.g. 100 KHz. A 1000 Hz tone present on the selected analog input passes through the filter 106, while all other frequencies that may be present are attenuated. The signal level of the 1000 Hz tone leaving the filter 106 is reduced by a second loss network 109, and it then enters a phase locked loop 110, e.g. National Semiconductor type LM567CH, configured as a 1000 Hz tone detector. A signal line 112 is enabled when the presence of 1000 Hz tone is detected by the detector 110. The signal line 112 extends to a bit position of the first input port 66 of the microprocessor unit 12 where it may be read as a data value by the microprocessor 30 during its program execution.

A digital multiplex circuit 114, implemented with a National Semiconductor type 74C150N chip, for example, is also provided in the power supply and tone detect unit 18. The function of the digital multiplex circuit 114 is to provide the microprocessor controller 12 with information indicative of the presence of line current on each of the 16 lines selectively connecting to the line connection units 20 through the group select units 22. The particular line connection unit line current signal line is also selected by the same information on the third output port 84 as selects the analog signal input line at the analog multiplexer 104. The output from the line current detection multiplex circuit 114 is provided to another bit position of the first data input port 66 where it may be received and processed by the microprocessor controller 30 as is done with the tone detect information on the line 112.

Dual Line Connection & Calling Card 20

Each of the eight line connection and calling units 20A through 20H includes a programmed CMOS digital microprocessor 120, such as NEC type D80C35C, which obtains its program instructions from a local two kilobyte programmable read only memory 122, such as a National Semiconductor type 27C16. The functions of the program resident in the local ROM 122 are described in conjunction with the discussion of FIGS. 8A and 8B which follows below.

The memory 122 is addressed by address values sent by the microprocessor 120 via an address latch 124. When a particular byte location of the memory 122 is addressed by a value latched in the latch 124, the data value at that address is returned to the processor 120 via a common data/address bus 125. The routines executed by the processor 120 are described subsequently in connection with the discussion of FIGS. 8A and 8B.

Each unit 20 includes two line connection and calling circuits. A first such circuit 126 includes an opto-isolator loop current detector 128, such as AEG/Telefunken type 4N25, which detects the presence of loop current on a selected tip and ring line pair to which the circuit 126 is connected. If line current is detected by the detector 128, the system microprocessor 30 is informed of that fact by the value supplied on the particular LC line, there being a separate such line for each line connection circuit of all units 20. A line transformer 129, such as Altran type C-1323, presents a proper termination impedance to the selected tip and ring wire pair, and it also enables test tone from a dial up test number from a long distance toll exchange to be received and sent to the analog tone detection multiplex circuit 104 on one of the sixteen SIG lines, as already explained. The loop of the line pair is closed by actuation of a relay circuit 130 which is directly commanded by a line P16 of the line circuit processor 120. Pulse dialing of a telephone number may be carried out by rapidly keying the relay circuit 130.

The second line connection and calling circuit 132 includes a loop detector 135, transformer 134 and relay circuit 136. It operates in the same fashion as the first circuit 126 with the exception that it is connected to a separate tip and ring wire pair of the central office.

Dual tone multiple frequency signalling for dial up purposes may also be provided by virtue of a DTMF encoder 138 and a DTMF decoder 140 connected to a data port of the processor 120. The DTMF encoder 138 may be American Microsystems (AMI) type S25089, for example; and, the DTMF decoder 140 may be Motorola type 4556BE, for example. The decoder chip 140 is being used in the disclosed circuit arrangement as a five line to two of eight line hex-to-DTMF converter. Selection of which line circuit 126 or 132 is to receive tone signalling is made by operation of a tone signalling relay circuit 142.

Group Select Cards 22

Each of the eight group select units 22A through 22H is connected to 16 central office line pairs. Two of those line pairs are selected and sent to a particular line connection unit 20. In this way, the system 10 has the capability of selecting 16 pairs from an available field of 128 total incoming pairs. A front cable connection 150 connects all of the eight group select units 22 in parallel. Wires 3-6 thereof extend to the first line connection and calling unit; the next four wires (7-10) extend to the second line connection unit, etc., so that each line connection circuit within a unit 20 has access to one of 16 pairs, each pair conceivably comprising a separate group. It will be appreciated by those skilled in the art that the system 10 may be used in central office locations of any size with any number of exchanges, and be useful to test any number of classes of service, providing the number does not exceed the number of external connections to the system 10. (Typically, there are 128 external connections, however, the number may be readily expanded in blocks of 128 by adding tiers of group select units 22 as may be needed to handle the actual number of lines feeding into the system 10).

A group select relay control circuit 152 is operated by the group select decoder 98 (which is physically resident on the modem unit card 14. The line select decoder 96 and the group select decoder 98 (FIG. 3) are addressed by data values put out by the system microprocessor 30 at its port 2 out 84.

When a particular group select unit 22 is selected by the system microprocessor 30, all of its 16 lines are connected to the 16 line connection and calling circuits of the units 20. Thus, only one group select unit will be active for any given calling batch. The line select relays LS1-8 of a group select unit 22 are uniformly powered by central office battery when a particular group select relay control circuit 152 is actuated. A deselected group select unit merely bridges the power connection on to the next such unit.

Control Program for Microprocessor 30

FIGS. 7A through 7F set forth the control routines executable by the microprocessor controller 30.

A main routine 158 (FIG. 7A) begins with a Start node 160. Buffers and registers of the microprocessor 30 and RAMs and 40 are set to initial values by execution of an Initialize System node 162 which immediately follows the Start node 160. A logical node 164 determines whether the modem card 14 is "off hook", meaning whether it is presently closing the loop of the central office telephone line 16.

If the modem is not "off hook", a logical node 166 determines whether the system 10 has been idle for more than some predetermined time period such as five minutes. If so, the modem unit 14 is reset at a node 168 and the program returns to the logical node 164. Thus, effectively every five minutes the modem 14 is checked to be sure that its internal controller 92 has not become locked up.

A logical node 170 determines whether the human mode has been selected, and if so, the main menu is printed at the node 172. If the human mode has not been selected, the menu generation step is skipped, and in either case, a prompt for input is sent at node 176. The next step is to enter a character input subroutine 178. This subroutine obtains character values from a character source, typically the remote terminal 17 via the central computer 15 and its modem 13, the telephone line 16 and the local modem card 14. A logical node 179 determines whether either mode (human or machine) has been presently selected (there is no default mode). If no mode has been selected yet, a logical node 179a determines whether the received character is an "S" value. If not, the incoming character is ignored, and the program jumps to node 177 to get another character. If an "S" is received at logical node 179a, the program jumps to the set routine at a node 190. As will be discussed in the description of the set routine, the next character must be an "M". If either the human mode or machine mode has been previously selected at node 179, loop 158 tests to see if any of the five valid commands have been received.

The loop 158 first tests for the letter "L" at a logical node 180. If an "L" is detected, the program jumps to a "Load" subroutine 182. If a "D" is detected at a logical node 184, the program jumps to a "Dial" subroutine 186. If an "S" is detected at a logical node 188, the program jumps to a "Set" subroutine 190. If an "I" is detected at a logical node 192, the program jumps to an "Inquire" subroutine 194. Finally, if an "M" is detected, the program jumps to a "Maintenance" subroutine 198. If none of these five characters is detected in a pass through the main loop 158, it returns to the beginning and reprints the main menu at the functional node 172.

Characters received via the modem 14 are placed into memory by an interrupt driven subroutine. They are removed from the buffer in the same order received, by the character input subroutine 178. The character input subroutine 178 (FIG. 7A) includes a logical node 200 which tests for detection of a remote carrier via the modem 14. If not, the program returns to the start node 160. If so, the character subroutine 178 then asks whether the buffer character count is greater than zero at a node 202. If not, then a return is made to the node 200. If so, it means that a string of characters has arrived and is present in a character string buffer of the modem 14, the number of characters contained therein being the basis of the buffer character count tested at the node 202.

Characters are obtained from the character buffer at a functional node 204 from a memory location pointed to by a character pointer. Then, the character count is reduced by one at a node 206; and, the program asks whether the character count remains greater than zero at a logical node 208. If so, a return 212 is called and the program returns to the main routine. If the buffer character count is not greater than zero, meaning all characters have been obtained from the character buffer, then all of the memory location pointers are reset at a logical node 210.

The "Load" subroutine 182 (FIG. 7B) begins by determining whether the data coming in from the central computer 15 is machine code or whether it is data arranged in "human operator" format. If it is machine code sent directly from the remote central computer 15, the Load subroutine 182 enters a "Get Line" subroutine 216 which functions to obtain a string of characters which may be up to 256 characters in length. String length is determined by placement of a carriage return character at the end of the string.

The syntax of a control line is as follows:

3N;48N where "3N" represents a channel number and has a value lying in a range from 1 to 128. (Zero value in the channel number field is a special character which means "delete"). The semicolon symbol represents a field separator, and the "48N" value represents a telephone number to dial which may be up to 48 digits long.

If there is no input at the line subroutine 216, a logical node 218 returns the program to the main loop 158. When a control line of characters is received, it is analyzed for proper syntax at a functional node 220.

If the channel number is zero, as tested at a logical block 222, the phone number list previously accumulated in the telephone number buffers is cleared at a functional block 224, and the program returns to the main menu 158.

If the channel number is greater than 128, as tested at a logical block 226, the program returns to the main menu 158; however, if the number lies in the predetermined acceptable range of 1 through 128, the line is parced by field, the channel number is stored in a channel number buffer and the telephone number is stored in a telephone number buffer associated logically with the channel number buffer. Then, the program returns to the logical node 216 to obtain the next control line and continues until all control lines in machine format are obtained and stored in buffers. As already mentioned, when no further control lines are in the character buffer, as tested at the node 218, the program returns to the main loop 158.

If the "human operator" mode is present, as tested by the node 214, the "Load" subroutine help menu is printed at a node 230. The line number (channel) is sent by the operator and obtained at a functional node 232. If the channel number is zero, as tested at a logical node 234, the telephone number list is cleared by a functional block 236 and program execution returns to the main loop 158. If the channel number is not zero, but exceeds 128, as tested at a logical node 238, execution of the Load subroutine also ceases and the program returns to the main loop 158.

If the line number is between 1 and 128, the value is stored for later use as a pointer to a location in memory for saving the telephone number which will be entered by the 1 operator. A call to the subroutine 216 "Get Line" at node 241 is used to get up to 48 digits of operator input which will be used as a telephone number that will be stored in memory, by functional node 244, beginning at a location pointed to by the line number entered previously. If no input is received by the subroutine 216 at node 241, determined by logical node 244, the program exits to the main menu node 158.

After the telephone number is stored by the function of the node 244, the number pointer is incremented by one at step 246. The new number is sent to the terminal via the modem and becomes the pointer to the storage location for the next phone number to be entered by the operator. Logical node 248 determines if the line number has been incremented past the last valid line number, and if so, forces a jump to the main menu node 158. If the line number is valid, the program jumps back to node 216 to get a telephone number from the operator. This completes the Load subroutine 182.

The "Dial" subroutine 168 (FIG. 7C) begins with selecting the first group to dial at a step 250. If pulse mode is to be used, as tested at logical node 252, a pulse mode command is then sent to the respective line cards 20 of the system 10.

A "Group" subroutine 256 is then executed which comprises sending a list of telephone numbers to each of the line cards 20 via a program step 300. Each card 20 stores its respective two telephone numbers to be dialed in response to the program step 300, and then a return is called at a step 302.

Next, a "seize line" command is sent to the line cards at a step 258. A four second delay then follows by virtue of a call to a four second delay subroutine 260 which provides a reasonable time for central office equipment to respond to the "off hook" status of the line cards. Then, the lines to which connection has been commanded are tested for loop current at a node 262. A "Dial" command is sent at a step 264 and this command causes each of the line cards 20 to commence dial up sequences, either by generation of dialing pulses or by sending of DTMF dial up control tones over the 16 telephone lines that have been seized at the step 258.

A delay period is provided until all of the dialing sequences have been completed at a step 266. The end of the dial time is noted for each telephone line at a step 268. Then, the tone detector circuit 18 is pointed to the first line at a step 270. A forty millisecond delay subroutine 272 is then called; and, tone detection is tested at a logical node 274.

If test tone from a long distance central office test number is actually detected at the node 274, a one millisecond delay is called at a step 276, and the presence of test tone is again tested at a node 278. This process is repeated for eighty such tests by virtue of a logical node 280 to be sure that the test tone is truly present constantly on the line. After successful completion of the 80 test cycles, the time of tone detection is recorded in memory and the telephone number successfully tested is removed from the next line list at a step 282. Then, the tone detector is pointed to the next line in order at a step 284.

If the last line is not yet passed, as tested at the node 286; and, the time for testing this particular group of 16 telephone numbers has not yet expired, as tested at a logical node 290, then the steps 272–290 are repeated. If the last line is passed as tested at the node 286, the tone detector is pointed back to the first line at a step 288.

When the time for testing a particular group has expired, and that time may range from one second to 300 seconds, an end of call time is marked for each one of the sixteen lines at a step 292; and, all lines and groups are deselected (released) at a step 294.

If there are further groups to test, as established at a logical node 296, the next group is selected at a step 298 and the dial subroutine is repeated. If there are no more groups to test as determined at the node 296, the program returns to the main menu 158, marking completion of the Dial subroutine 186.

The "Set" subroutine 190 (FIG. 7D) begins with a step 304 for printing an appropriate menu to the operator if the system 10 is operating in the "human operator" mode. If the system 10 is operating in the machine code mode, this step is skipped. The character input subroutine 178 is then called.

Node 305 determines whether a mode (machine or human) has been previously selected. If a mode is selected, the character received is tested at node 306. If no mode has been selected, the character is tested at 305a to determine if the mode is an "M" If it is, control is transferred to node 328 to set the machine mode. If the input is not an "M" at node 305a, the input is ignored and control is returned to node 158. As mentioned above, until a mode has been selected, the only valid character at node 158 is an "S".

If a character "C" (for set clock) is detected at a node 306, twelve characters followed by a carriage return are then acquired for hours, minutes, seconds, month, day and year. These values are stored and are used to reset and start the operation of the clock chip 36 when the next carriage return arrives.

If a character "X" is detected at a node 310, a functional node 312 receives one of eight predetermined different group calling times for each group, the time specified lying within the 1–300 second range.

If an "F" is detected at a node 314, the next character to be received is defined as the field separator designator by virtue of a step 316. (The default separator is e.g. the semicolon symbol ";", as already mentioned above).

If a "T" is detected at a node 318, the next character to be received is defined as the line terminator by virtue of a step 320. (The default line terminator character is a carriage return symbol).

If an "H" is detected at node 322, the operational mode is set to human, the copyright notice is printed on the remote terminal 17, the field separator is set to "TAB", and the line terminator is set to a carriage return/line feed combination. If an "H" is not detected at the node 322, logical node 326 tests the input for an "M". If an "M" is detected, the operational mode is set to machine (no menus will be printed), the field separator is set to ";" and the line terminator is set to a single carriage return. Then, the program is returned to the main loop 158, marking the end of the Set subroutine 190.

The "Inquire" subroutine 194 (FIG. 7E) begins with a call to the character input subroutine 178. If a line termination character is detected at a logical node 330, the contents of the operational status buffer are printed out at a step 332. In human mode, a portion of a typical printout on the display screen of the operator terminal 17 (or a printer) might appear as follows:

| LINE | End of Dial | Tone Detect | End of Call | |
|------|-------------|-------------|-------------|---|
| 01 | 10:24:36 | 10:25:00 | 10:25:36 | (Successful call) |
| 02 | xxxxxxxx | xxxxxxxx | 10:25:35 | (Bad Local Line) |
| 03 | 10:24:36 | xxxxxxxx | 10:25:36 | (No Tone Det.) |

If a "C" is detected at a node 334, the time and date is printed at a step 336.

If a "Q" is detected at a node 338, the number of tested groups is printed at a step 340.

If a "V" is detected at a node 342, the version number of the control program is printed out at a step 344.

If an "L" is detected at a node 346, the telephone numbers presently contained in the telephone number list buffer memory are printed out at a step 348.

Successful detection of one of the above-described inquire control characters and the corresponding functional activity ends with a return to the main loop 158. Also, once the Inquire subroutine 194 is entered, if no inquire control characters are received, the subroutine 194 likewise returns to the main routine 158.

The "Maintenance" subroutine 198 (FIG. 7F) is provided principally for system check out and for carrying out single line dialling. It enables the system 10 basically to be single stepped through the functions it otherwise carries out automatically. This subroutine 198 begins with printing of the maintenance menu and setting up of default values at a step 350. Status of the maintenance mode is displayed at a step 352.

Receipt of any maintenance subroutine control characters is tested for at a logical node 354. If no such characters have been entered by the operator, the subroutine 198 loops back to the menu/status display step 352. If a maintenance control character has been received, then it is decoded and acted upon.

If a "V" is detected at a node 356, the system 10 is set to "video" mode and line feeds are eliminated at a step 358.

If a "Tab" character is detected at a node 360, the next group is selected at a step 362.

If a "Return" character is detected at a node 364, the previous group is selected at a step 366.

If an "N" is detected at a node 368, the next line is selected at a step 370.

If a "P" is detected at a node 372, the previous line is selected at a step 374.

If a "Z" is detected at a node 376, all lines are deselected at a step 378.

If a numeral lying in a range between zero and nine is detected at a node 380, the number is added to the dial buffer at a step 382.

If a "D" is detected at a node 384, the number presently contained in the dial buffer is dialed at a step 386.

If a "C" is detected at a node 388, the dial buffer is cleared of all numbers at a step 390.

After detection of one of the maintenance control characters and concomitant action, program execution returns to the step 352 which thereby displays the updated system status in the maintenance mode.

If an "R" is detected at a node 392, execution of the subroutine returns to the menu display step 350 with the result that all of the original default parameters become reset.

If a Control-C is detected at a node 394, the maintenance subroutine 198 is terminated and program control is returned to the main loop 158.

Control Program for Line Cards 20

Figure 8A:
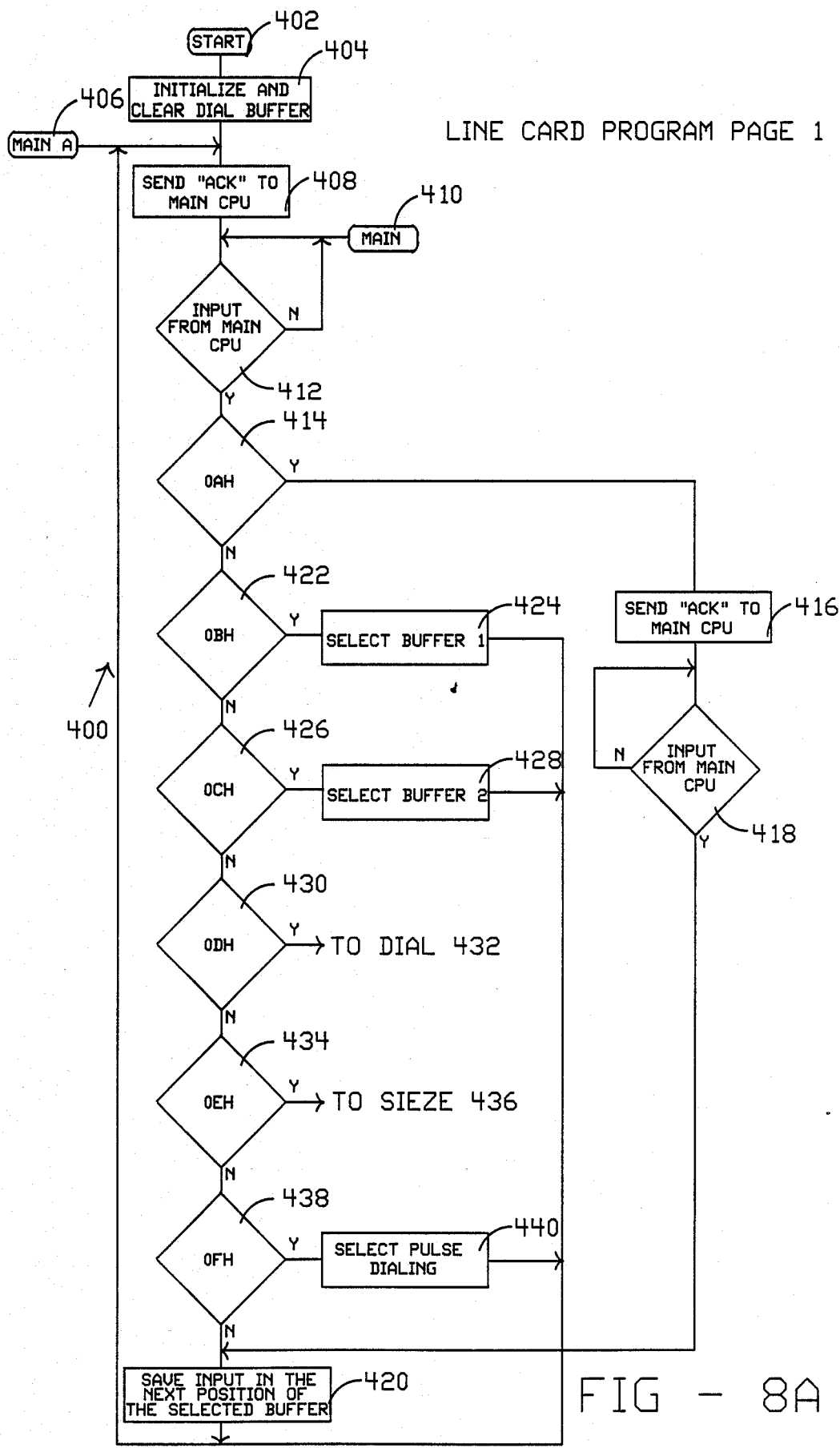
FIGS. 8A and 8B comprise a flow diagram of a control program for controlling operation of the FIG. 5 line connection and calling units.
Figure 8B:
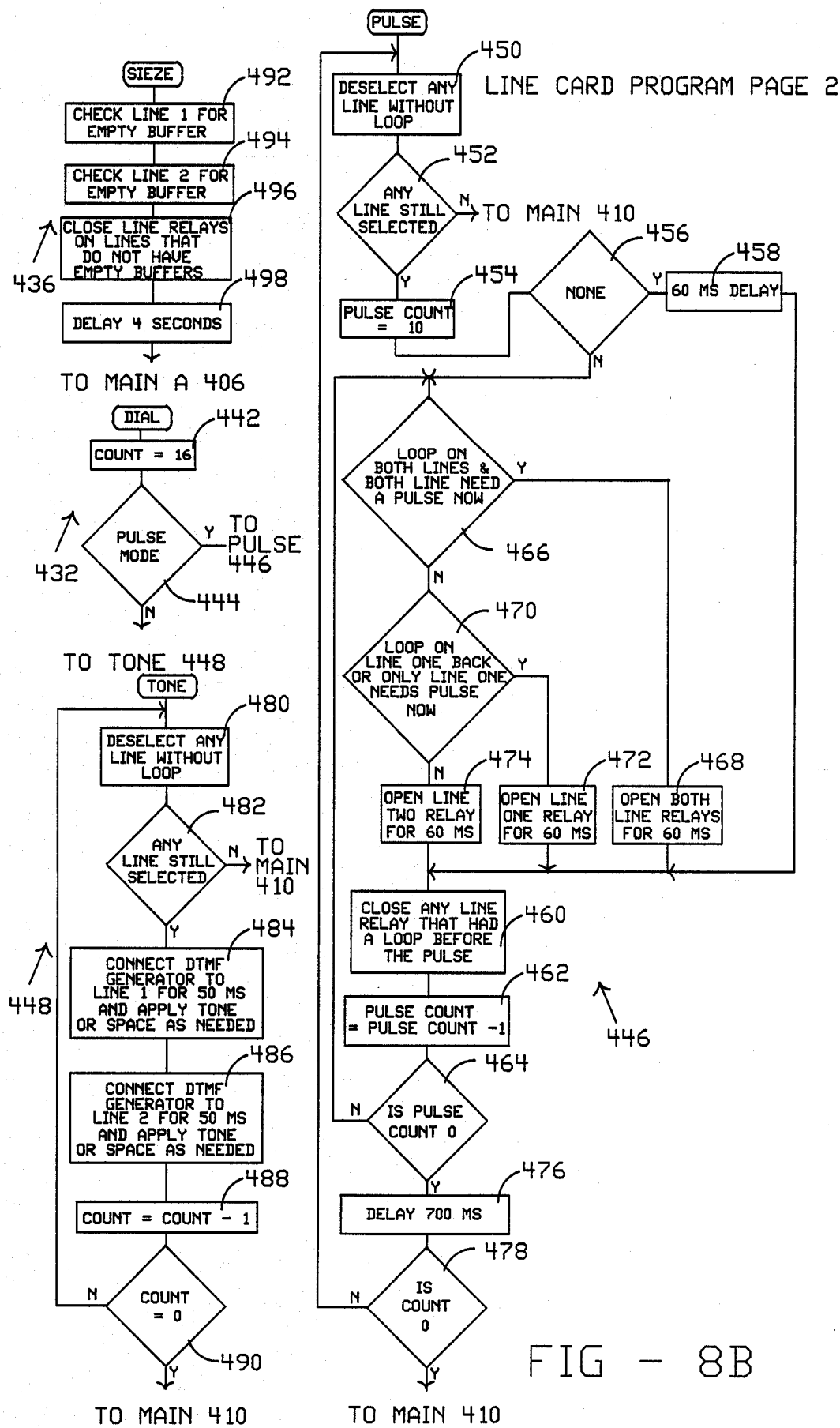

The control program for each of the eight line cards 20 is set forth in FIGS. 8A and 8B. It will be appreciated by those skilled in the art that the FIGS. 7A-7F control program for the microprocessor controller 30 ("main CPU") runs simultaneously and asynchronously with the control programs of the eight line cards 20. Each line card services two telephone lines. The line card control program monitors the four bit data bus by looking for a strobe signal on its particular strobe line LS as decoded by the line card strobe decoder 96 resident on the modem card 14 and acknowledging to the master on the acknowledge line BAR ACK. The data present on the four bit data bus (port 2 out 84) is in hexadecimal format.

A line card main loop 400 (FIG. 8A) begins with a start node 402 which is pointed to upon receipt of a line card reset command on a line BAR LCR from a predetermined bit position of the first output port 60. The line card processor 120 is initialized and the dial number buffers are cleared at a step 404. A MAINA acknowledge entry point 406 is provided for subroutine returns which require that an acknowledge signal be sent back to the main controller 30. A "send ACK" to the main processor 30 step 408 causes a logic level low or true signal to be placed on the acknowledge line BAR ACK leading back to the control unit 12.

A main loop entry point 410 is provided for subroutine returns which do not require an immediate acknowledge signal to be sent back to the main CPU 30.

The program loops at node 410 until a strobe signal is detected from the main CPU 30 at the logical node 412. The main loop then tests the character to determine what action to take.

If the first character is 0A(Hex) as tested at a node 414, an acknowledge signal is generated at a step 416 and sent back to the main CPU 30. Then, a logical step 418 loops until an input value is received from the main CPU 30. When such an input value has been received by the line card, the input value is stored in the next available position of a selected buffer at a step 420. Either a buffer one or a buffer two is selected or has been previously selected, and each is provided to contain a telephone number to be dialed automatically by the line card 20. The program then returns to the MAINA entry point 406 and generates an acknowledge signal at the step 408, etc.

If the value received following a strobe signal is a 0B(Hex) value, as tested at a logical node 422, buffer one is selected at a step 424, and the program returns to the MAINA entry point 406. If the value received following the strobe signal is a 0C(Hex) value, as tested at a logical node 426, buffer two is selected at a step 428, and the program again returns to the MAINA entry point 406.

If the value received following the strobe signal is a 0D(Hex) value, as tested at a logical node 230, a call is made to a dial subroutine 432, discussed hereinafter in connection with FIG. 8B. If the value received following the strobe signal is a 0E(Hex) value, as tested at a logical node 434, a call is made to a line seize subroutine 436, also discussed in conjunction with FIG. 8B. If the value received following the strobe signal is a 0F(Hex) value, as tested at a logical node 438, pulse dialing mode for this particular line card 20 is selected at a step 440, and the program returns to the MAINA entry point 406.

Any other value received from the main CPU 30 is simply stored in the next available hex character position of the pointed-to buffer and is treated as a dial up digit.

The telephone number capable of being dialed up by the line card 20 in a single dial up program sequence is up to 16 digits in length. The dialing sequence is repeated three times in order to achieve dial up of a telephone number having as many as 48 digits, if using DTMF signalling. There is a 16 digit limit when pulse dialing. Each predetermined telephone number to be dialed is "front end padded" which is to say that the last digit to be dialed is always stored in the 48th position of the buffer and the number is front end padded with null dial characters. A domestic long distance number is typically ten or eleven digits long, depending upon whether a one prefix must appear before the area code. Front end padding of the telephone number is very important to the success of the present invention, since it means that actual simultaneous dialing of all line cards ends at exactly the same time for all sixteen lines being seized. Whatever happens after that common time mark is more easily measured and recorded than if each dialing sequence ended at its own time.

The seize subroutine 436 (FIG. 8B) includes a step 492 to check the line one buffer to see if it is empty. The line two buffer is similarly checked at a step 494. On lines which contain telephone number values, the line relays are actuated at a step 496. A four second delay step 498 then follows to allow for the central office equipment to locate the seized line and to supply dial tone. The seize subroutine 436 then returns to the MAINA entry point 406 of the main loop 400.

The dial subroutine 432 (FIG. 8B) includes a step 442 which sets a count equal to 16 which corresponds to the maximum number of digits that will be dialed in dialing up the number. Pulse dial mode is tested at a logical node 444. If the test is true, a pulse subroutine 446 is called, and if the test is false, a DTMF tone subroutine 448 is entered.

The pulse subroutine 446 includes a first step 450 which deselects any telephone line which has no loop current, as tested by the loop current test circuitry of the line card 20. If both telephone lines serviced by the particular line card are deselected at the step 450, the logical node 452 returns program control to the MAIN entry point 410 of the main loop to await further instruction from the main CPU. If any telephone line remains still selected after the deselect step 450, as tested at a logical node 452, the pulse count is set to be equal to ten at a step 454.

The maximum number of pulses to be dialed is ten, which corresponds to the digit zero on the rotary telephone dial. If the digit zero is to be dialed, then ten 60 millisecond pulses are generated within a predetermined time period by the pulse subroutine 446. If no digit is to be dialed because the program is providing a front end null value, or is providing 60 millisecond no pulse null values within a digit sequence, as tested at a logical node 456, a 60 millisecond delay with no relay action is provided at a step 458. Thus, if a digit four were to be dialed, the first six pulse times would be null values, and delays would be provided by the step 458. The next four pulse times would result in actual 60 millisecond open loop pulses.

If both lines have loop current and both of the lines need a pulse during a particular pulse cycle, as tested at a logical node 466, a step 468 opens both line relays L1 and L2 of the line card 20 for 60 milliseconds and then closes them. If loop current is present on line 1 only, as tested at a node 470, the line one relay L1 is opened for 60 milliseconds at a step 472, and the line 2 relay is not actuated (it remains open, since no loop current was detected during the seize subroutine 436). Similarly, if loop current is present only on line two, as tested by the logical node 470, the line 2 relay L2 is opened for 60 milliseconds by a step 474 and the line 1 relay L1 remains unactivated. After 60 milliseconds of open loop pulsing, the line relay or relays are again closed at a step 460. The dial pulse count for the particular digit being dialed is then decremented by one at a step 462. If the pulse count has reached zero, as tested by a node 464, the pulsing for a particular dial up digit is complete and a 700 millisecond delay is reached at a step 476. The telephone number digit count is then tested at a logical node 478 to see if it has reached zero, meaning that the last digit of the telephone number has been pulse dialed. A return is then made to the MAIN entry point 410 of the main loop 400. Otherwise, pulse dialing subroutine execution returns to the node 450 and the foregoing sequence is repeated until the last digit of the number to be called is pulse dialed.

If the DTMF tone mode is specified, as tested by the logical node 444 of the dial subroutine 432, the DTMF tone subroutine 448 (FIG. 8B) is called. In the tone mode, any line not having loop current is deselected at a step 480. If no lines remain selected after the deselect step 480, program execution returns to the MAIN entry point 410 of the main loop 400. If one or both lines remain selected, then an appropriate DTMF tone is generated by the DTMF generator 138 and is applied by operation of the TS relay circuit 142 to line 1 for e.g. 50 milliseconds at a step 484. If a null value is appropriate for this digit sequence, no tone is put out during the 50 millisecond interval, for the same reasons as discussed above in conjunction with pulse dialing.

Then, an appropriate DTMF tone is generated by the DTMF generator 138 and put out to line 2 (or a null value is put out) for 50 milliseconds at a step 486, which causes the TS relay circuit 142 to actuate to a reverse state as it has for line 1.

The telephone number count is then decremented by one at a step 488, and the number counter is tested for zero state at a logical node 490. If the telephone number digit count has not yet reached zero, the DTMF tone dial subroutine returns to the step 480 and repeats until all digits have been dialed. If the telephone number digit count equals zero, program execution returns to the MAIN entry point 410 of the main loop 400.

As already mentioned, in order to dial up a test telephone number to be checked having as many as 48 digits, the dial subroutine 432 may be repeated three times for each digit. If all of the telephone numbers to be simultaneously dialed are of a length less than 16 digits each, then the dial subroutine may be limited to a single pass.

Having thus described an embodiment of the invention, it will now be appreciated that the objects of the invention have been fully achieved, and it will be understood by those skilled in the art that many changes in construction and widely differing embodiments and applications of the invention will suggest themselves without departing from the spirit and scope of the present invention. The disclosures and the descriptions herein are purely illustrative and are not intended to be in any sense limiting.

We claim:

1. Apparatus for automatically generating and recording precisely timed telephone call test sequences useful to determine accuracy of telephone toll message accounting equipment and procedures nominally recording the fact and time of the calls made during each sequence, the apparatus connected to plural telephone network lines of the telephone system at a predetermined location for simultaneously dialing a plurality of predetermined long distance telephone numbers, each said number returning detectable information when successfully dialed up, for detecting the presence of said detectable information of each number so dialed and for thereupon logging the time of each call in which said detectable information has been detected, the apparatus comprising:

plural programmable digital line connection and calling means, each one thereof being capable of accessing and seizing at least one telephone line for placing a telephone call thereon to a predetermined long distance telephone number, group switching unit means connected to said plural programmable digital line connection and calling means and to telephone lines for selectively connecting said ones of said telephone lines with said plural line connection and calling means, digitally controlled call connection detection means for sequentially scanning all of the dialed up telephone lines and for detecting the presence or absence of said detectable information when a said number has been dialed, and programmed digital controller means including memory and real time clock means connected by digital bus means to said plural line connection an calling means, to said group switching unit means and to said digitally controlled call connection detection means for carrying out a said sequence by controlling selective connections of said telephone lines with said plural line connection and calling means, for providing said predetermined long distance telephone numbers thereto via said digital bus means and thereupon controlling dial up operation of each said line connection and calling means and for causing said call connection detection means to scan the dialed up telephone lines, the controller means being programmed for recording in said memory as data base information the precise real time and result for each call attempted during a said sequence.

2. The apparatus set forth in claim 1 further comprising modem means connected to said programmed digital controller means and connectable to a telephone network line for receiving commands from a remote control point and for returning said data base information to said remote control point, via said line.

3. The apparatus set forth in claim 1 wherein said plural line connection and calling means includes automatic dial up means for simultaneously dialing up to sixteen telephone numbers.

4. The apparatus set forth in claim 3 wherein each said line connection and calling means comprises a programmed digital microprocessor for receiving from said controller means via said digital bus means and latching at least one said telephone number to be dialed up from said controller means.

5. The apparatus set forth in claim 4 wherein each said line connection and calling means connects to two telephone lines and wherein said programmed digital microprocessor causes both telephone lines to receive sequences of telephone number dial up values, both sequences ending at substantially the same time.

6. The apparatus set forth in claim 1 wherein each said line connection and calling means includes a line calling ready state detection means for detecting and reporting to the programmed digital controller means the presence of a line calling ready state such as loop current on a telephone line to which said line connection and calling means has been selectively connected.

7. The apparatus set forth in claim 1 for installation at a telephone central office location and further comprising power supply means for converting voltage levels obtained directly from a central office battery supply into operating voltages for operating said apparatus.

8. The apparatus set forth in claim 1 wherein each said line connection and calling means includes means for generating pulse dial up sequences and DTMF dial up sequences, the operating mode of said line connection and calling means as between pulse and DTMF being controllable by said controller means.

9. The apparatus set forth in claim 1 wherein said detectable information comprises a test tone having a predetermined frequency and wherein said call connection detection means comprises test tone detection means selectively connectable under program control of the controller means to each said telephone line for detecting the presence of test tone on each said telephone line and for informing said controller means of each instance of detection thereof.

10. The apparatus set forth in claim 1 wherein the programmed digital controller is programmed to record in said memory for each line as said data base information the real times of a signal indicating a calling ready state, a signal indicating dialing completion, a signal indicating detection or non-detection of said detectable information, and a signal indicating completion of each call resulting in detection of the said detectable information.

11. A method for automatically generating and recording at a central office location precisely timed telephone toll calls within a telephone system in order to determine accuracy of telephone toll message accounting equipment at the central office location relied upon by the system to record the fact and time of said calls within a telephone system, the method being carried out with a remotely controlled test apparatus comprising a plurality of programmable digital line connection and calling cards, each card being capable of connecting to a plurality of telephone lines; at least one group switching unit connected to said plural line connection and calling cards and to multiple telephone lines of said central office for selectively connecting predetermined ones of said telephone lines with each said plural line connection and calling cards; a call connection detector for detecting the presence of a test condition which is returned when a toll test number has been dialed, and a programmed digital controller including memory and a real time clock connected by a digital bus to said plural line connection and calling cards, to said group switching unit, and to the call connection detector, the method comprising the steps of:
 a. receiving and storing in the memory via the programmed digital controller a sequence of telephone line/toll test numbers to be dialed automatically;
 b. retrieving with the controller a first group of telephone line/toll test numbers from the sequence thereof stored in memory and sending them to the plural line connection and calling cards via the digital bus;
 c. storing each telephone line/toll test number in a register of each line connection and calling card;
 d. connecting each line connection and calling card to the telephone lines via the group switching unit under control of the controller;
 e. seizing the connected telephone lines with the line connection and calling cards;
 f. testing for a calling ready condition on each line with the line connection and calling cards and reporting the presence or absence of the calling ready condition on each line to the controller;
 g. simultaneously causing each line connection and calling card generate and put out a dial up sequence for each telephone line/toll test number on each line determined to have the calling ready condition;
 h. recording in the memory via the controller the precise real time of completion of the dial up;
 i. sequentially checking each dialed up line for the presence of test condition with the call connection detector;
 j. recording in the memory via the controller the precise real time of detection of tone for each dialed up line upon which test tone has been detected; and
 k. repeating the foregoing steps for each successive group of the sequence until all of the telephone line/toll test numbers have been processed by said controller.

12. The method set forth in claim 11 wherein the remotely controlled apparatus further comprises a modem enabling dial up communications with a central control location, the method further comprising the steps of:
 l. generating the sequence of telephone line/toll test numbers at the central control location,
 m. dialing up the remotely controlled apparatus, n. sending the sequence from the central control location to the controller of the apparatus via the modem, and o. accumulating in the memory and sending to the central control location as a data batch the recorded times of completion of dial up and detection of tone for each line determined to have loop current.

13. The method set forth in claim 11 wherein a line connection and calling card is selectively able to dial a telephone number via a line to which it is connected by one of dual tone multifrequency tone signalling and pulse dialing modes, and comprising the further step of selecting dialing mode for the line connection and calling card prior to storing the telephone line/toll test number in the buffer of the card.

14. The method set forth in claim 11 wherein the step of simultaneously causing each line connection and calling card to dial up each telephone line/toll test number comprises the step of generating dialing signals in a manner in which the last digit of all of the telephone line/toll test numbers being dialed up will be dialed up at the same time, irrespective of actual digit length of each telephone line/toll test number.

* * * * *